Jan. 1, 1929.   1,697,316
F. HORNY
METHOD OF CONNECTING THE PLATES OF ELECTRIC
CONDENSERS AND THE LIKE TO THEIR SUPPORTS
Filed May 12, 1927
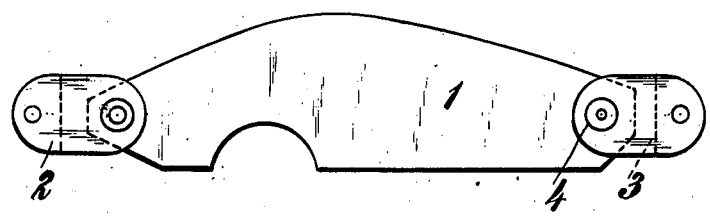
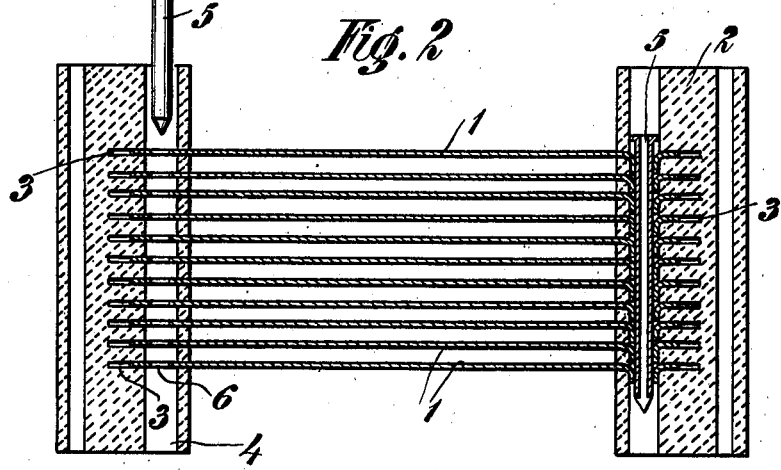
Inventor:
Friedrich Horny Patented Jan. 1, 1929.

1,697,316

UNITED STATES PATENT OFFICE.

FRIEDRICH HORNY, OF VIENNA, AUSTRIA.

METHOD OF CONNECTING THE PLATES OF ELECTRIC CONDENSERS AND THE LIKE TO THEIR SUPPORTS.

Application filed May 12, 1927, Serial No. 190,947, and in Austria January 25, 1927.

The object of the present invention is to provide means whereby the parallel, spaced plates of variable electric condensers and the like can be secured to their supports in a convenient and reliable manner, and the invention consists in forming each support with slits for the reception of the plates and with a channel which intersects said slits for the reception of a binding pin adapted, when driven through the channel, to press off flanges from the plates and clamp said flanges to the channel walls.

Fig. 1 of the accompanying drawings represents a plan view of the fixed electrode of a variable electric condenser, and Fig. 2, a section of the same taken in the longitudinal direction of the supports, one side of the same being in process of completion.

The supports 2 to which the parallel and spaced plates 1 of a variable electric condenser or the like are secured, are formed with slits 3 for the reception of the plates. For securing the plates to the supports, the latter are provided with channels 4 which intersect the slits 3 for the reception of binding pins 5 adapted, when driven through the channel, to press off flanges from the plates and clamp said flanges securely to the channel walls. In the arrangement shown, the channels 4 are in the form of bores, and the plates are formed with apertures 6 which are coaxial with the bore and which guide the binding pins and ensure a correct positioning of the plates relative to one another and to the supports. The binding pins, which are smaller than the bores and larger than the apertures 6, may be tubular as shown.

Connected together in this fashion the plates and the supports will be securely interlocked, and a perfectly rigid structure will be obtained. Perfect electric continuity between the different plates is also ensured, and as the fastening method is exceedingly simple, it lends itself to the construction of a condenser which is cheap and yet of the highest quality.

The supports 2 may be made of metal, for instance aluminium, in which case the terminal screw can be applied to some part of the supports. However, the supports may be made of insulating material, such as vulcanite or the like in which case the terminal screw is connected to one of the binding pins 5.

I claim:

1. A method of securing parallel, spaced plates of variable electric condensers and the like to their supports, consisting in slitting the supports for the reception of the plates, forming the supports with channels which intersect the slits, and driving binding pins through the channels after the plates and supports have been assembled so as to press off flanges from the plates and clamp said flanges to the channel walls.

2. A method of securing the parallel, spaced plates of variable condensers and the like to their supports, consisting in slitting the supports for the reception of the plates, forming the supports with bores which intersect the slits, forming the plates with apertures which are concentric with the bores when plates and supports are assembled, said apertures being of smaller diameter than the bores, and driving binding pins of larger diameter than the apertures through the latter and through the bores so as to press off flanges from the plates and clamp said flanges to the walls of the bores.

FRIEDRICH HORNY.